C. C. BERGSTROM.
STAKE HOLDER.
APPLICATION FILED FEB. 24, 1919.
1,353,624.
Patented Sept. 21, 1920.
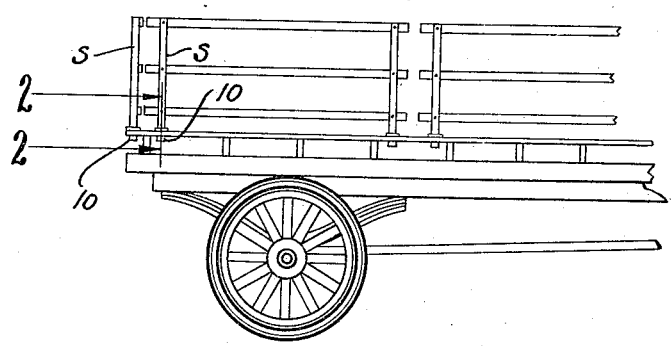
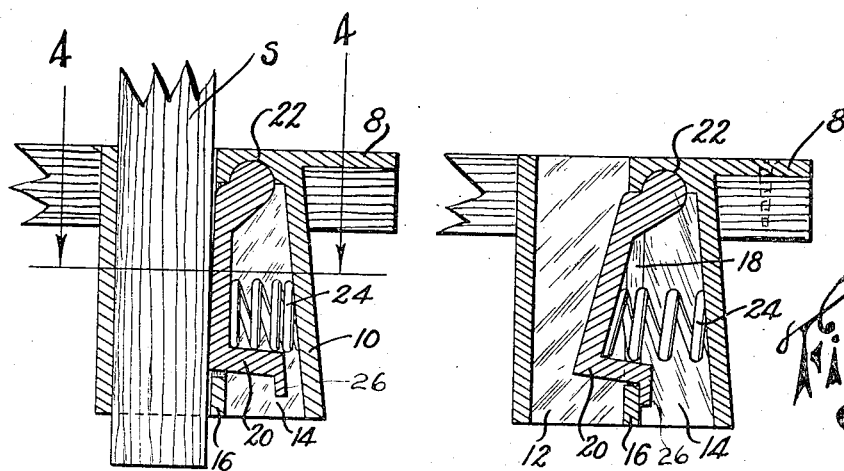
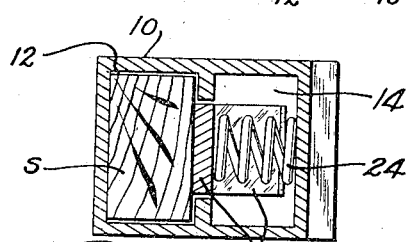
Inventor
C. C. Bergstrom

UNITED STATES PATENT OFFICE.

CUTHBERT C. BERGSTROM, OF DENVER, COLORADO, ASSIGNOR TO THE BERGSTROM-BREWSTER MOTOR COMPANY, OF DENVER, COLORADO, A CORPORATION OF COLORADO.

STAKE-HOLDER.

1,353,624.

Specification of Letters Patent.   Patented Sept. 21, 1920.

Application filed February 24, 1919.   Serial No. 278,981.

*To all whom it may concern:*

Be it known that I, CUTHBERT C. BERGSTROM, a citizen of the United States, residing at the city and county of Denver and State of Colorado, have invented certain new and useful Improvements in Stake-Holders; and I do declare the following to be a full, clear, and exact description of the invention, such as will enable others skilled in the art to which it appertains to make and use the same, reference being had to the accompanying drawings, and to the characters of reference marked thereon, which form a part of this specification.

This invention relates to stake holders for use on truck or wagon bodies. The object is to firmly but movably retain the stakes or gates commonly used on trucks and the like for confining the load.

Briefly, the invention comprises a holder having a socket, in one wall of which there is mounted a spring-pressed dog adapted to engage and removably retain a stake inserted in the socket.

In the drawings:

Figure 1 represents a truck body with the invention applied.

Fig. 2 is a vertical section indicated by line 2—2 of Fig. 1.

Fig. 3 is a similar section with the stake removed.

Fig. 4 is a horizontal section on line 4—4 of Fig. 2.

A flange 8 is provided on the holder 10 for securing the same on the truck body. The holder has a stake-receiving socket 12 and a spring chamber 14 separated from the socket by a partition 16. An aperture 18 is provided in the partition through which a dog 20 extends, the latter having a hinged mounting at 22, as shown, and being pressed through the aperture by a strong spring 24. The movement of the dog is limited by a flange 26 on its lower end, which engages the lower web of the partition 16.

A stake S is inserted in the socket, being forced down along the face of the dog into position as shown in Fig. 2. The strong spring 24 causes the dog to clamp the stake firmly. Draft on the stake will readily remove it; or if the lower end of the dog becomes embedded in the stake, an edged tool may be inserted between the flange 26 and partition 16 to retract the dog.

I claim:

1. A stake holder, having a stake-receiving socket and a chamber, a partition between the socket and the chamber, the partition having an aperture, an outer socket wall and an outer chamber wall, said walls being on opposite sides of said aperture, a dog movable in said aperture, and a spring in the chamber and engaging the dog to project it through said aperture and interposed between the dog and said outer chamber wall, the lower end of the dog having a laterally extending ledge partially forming a pocket to assist retention of the spring in operative position.

2. A stake-holder, having a stake-receiving socket and a chamber, a partition between the socket and the chamber, the partition having an aperture, an outer socket wall and an outer chamber wall, said walls being on opposite sides of said aperture, a dog movable in said aperture, and a spring in the chamber and engaging the dog to project it through said aperture and interposed between the dog and said outer chamber wall, the free end of said dog having a projecting member thereon adapted to engage the partition adjacent the aperture to limit movement of the dog.

In testimony whereof I affix my signature.

CUTHBERT C. BERGSTROM.